US007552666B2

(12) United States Patent
Liu et al.

(10) Patent No.: US 7,552,666 B2
(45) Date of Patent: Jun. 30, 2009

(54) SAWING MACHINE

(75) Inventors: Chia-Sheng Liu, Chiayi County (TW); Chieh-Yuan Tsai, Taichung County (TW)

(73) Assignee: Durq Machinery Corp., Taichung (TW)

( * ) Notice: Subject to any disclaimer, the term of this patent is extended or adjusted under 35 U.S.C. 154(b) by 209 days.

(21) Appl. No.: 11/727,439

(22) Filed: Mar. 27, 2007

(65) Prior Publication Data

US 2008/0115644 A1 May 22, 2008

(30) Foreign Application Priority Data

Nov. 16, 2006 (TW) .............................. 95142476 A

(51) Int. Cl.
*B23D 19/00* (2006.01)

(52) U.S. Cl. .......................... 83/471.3; 83/473; 83/490; 83/581

(58) Field of Classification Search ................ 83/471.3, 83/472, 473, 477.1, 490, 581; 30/519; 16/408–411
See application file for complete search history.

(56) References Cited

U.S. PATENT DOCUMENTS

| | | | | |
|---|---|---|---|---|
| 6,595,095 | B2 * | 7/2003 | Chen | 83/473 |
| 6,658,976 | B2 | 12/2003 | Dils et al. | |
| 6,769,338 | B2 * | 8/2004 | Svetlik et al. | 83/471.3 |
| 2002/0100352 | A1 * | 8/2002 | Dils et al. | 83/473 |
| 2003/0010171 | A1 * | 1/2003 | Liu | 83/490 |
| 2004/0255748 | A1 * | 12/2004 | Dils et al. | 83/581 |
| 2006/0112804 | A1 * | 6/2006 | Dils et al. | 83/581 |

* cited by examiner

*Primary Examiner*—Stephen Choi
(74) *Attorney, Agent, or Firm*—Browdy and Neimark, P.L.L.C.

(57) ABSTRACT

A sawing machine includes a base, a saw arm assembly pivotally connected to the base and having a L-shaped groove defined therein, a saw blade pivotally mounted to the saw arm assembly, a handle pivotally mounted to the L-shaped groove of the saw arm assembly for rotatable movement relative to the saw arm assembly, and a locking mechanism mounted to the handle for locking the handle to the saw arm assembly. Before operation, the handle is adjusted to the best angle that the user can conveniently apply the force, so that the user can operate the sawing machine easily and conveniently.

6 Claims, 6 Drawing Sheets

SAWING MACHINE

BACKGROUND OF THE INVENTION

1. Field of the Invention

The present invention relates to a sawing machine and more particularly, to a sawing machine, which allows the operator to easily apply the force to operate the sawing machine conveniently and easily.

2. Description of the Related Art

U.S. Pat. No. 6,658,976, entitled "Ergonomic miter saw handle", disclosed an ergonomic miter saw having a base and a saw arm assembly pivotally mounted to the base, and a cutting disk pivotally mounted to the saw arm assembly. The saw arm assembly is connected with a handle through a rotatable joint for rotation of the handle.

Before cutting the workpiece that has been placed on the base, the operator must adjust the tilting angle of the cutting disk. At this time, the user can rotate the rotatable joint to the desired angle and then use a locking mechanism to lock the handle. After the handle is locked, the user can hold the grip of the handle and then force the cutting disk downward to move and to cut the workpiece.

According to the aforesaid design, the handle and the rotatable joint have a common pivot axis therethrough so that the handle is pivotable together with the saw arm assembly and adjustable to the desired angle by means of the rotatable joint. However, when moving the handle downwards to lower the cutting disk during a cutting operation of the miter saw, the operator cannot easily force the handle downward to drive movement of the cutting disk. Therefore, this design of miter saw is still not convenient in operation.

SUMMARY OF THE INVENTION

The present invention has been accomplished under the circumstances in view. It is the main object of the present invention to provide a sawing machine, which facilitates force exertion and enhances the operational convenience.

To achieve the foregoing object of the present invention, the sawing machine is composed of a base, a saw arm assembly pivotally connected to the base and having a L-shaped groove defined therein, a saw blade pivotally supported on the saw arm assembly, a handle pivotally coupled to the L-shaped groove of the saw arm assembly and rotatable relative to the saw arm assembly, and a locking mechanism installed in the handle and connected to the saw arm assembly for locking the handle to a predetermined angle of the saw arm assembly. The L-shaped groove has a first groove portion and a second groove portion both of which are connected at the right angle.

Further, the saw arm assembly includes a sliding block movable along the first groove portion of the L-shaped groove. The handle is movable along the second groove portion of the L-shaped groove and connected with the sliding block. Thus, the handle is rotatable relative to the saw arm assembly.

Before operating the sawing machine, the user can adjust the handle to the best angle convenient for applying the force, so that the user can operate the sawing machine conveniently and easily.

DETAILED DESCRIPTION OF THE INVENTION

Figure 1:
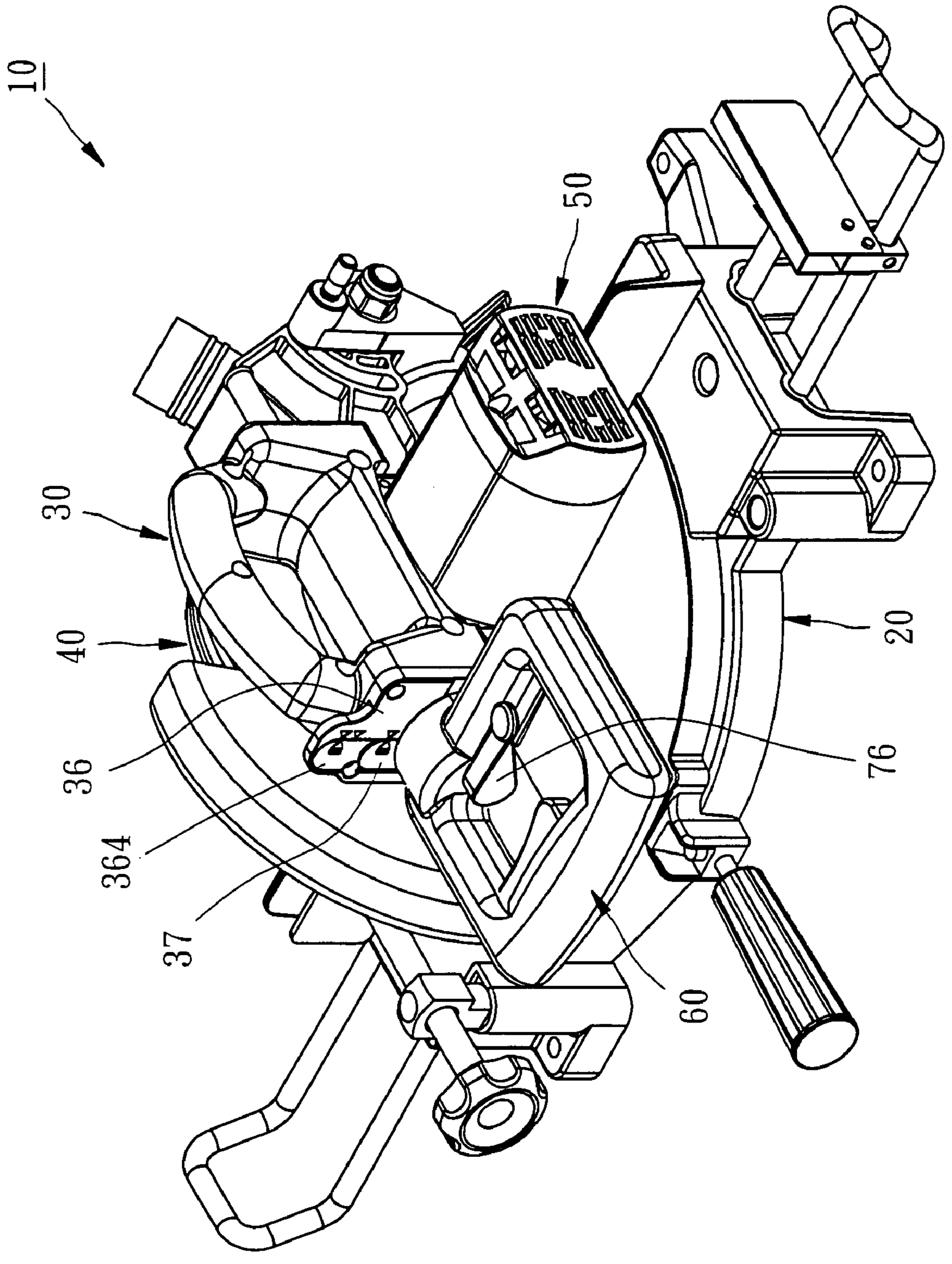
FIG. 1 is a perspective view of a sawing machine according to the present invention.
Figure 2:
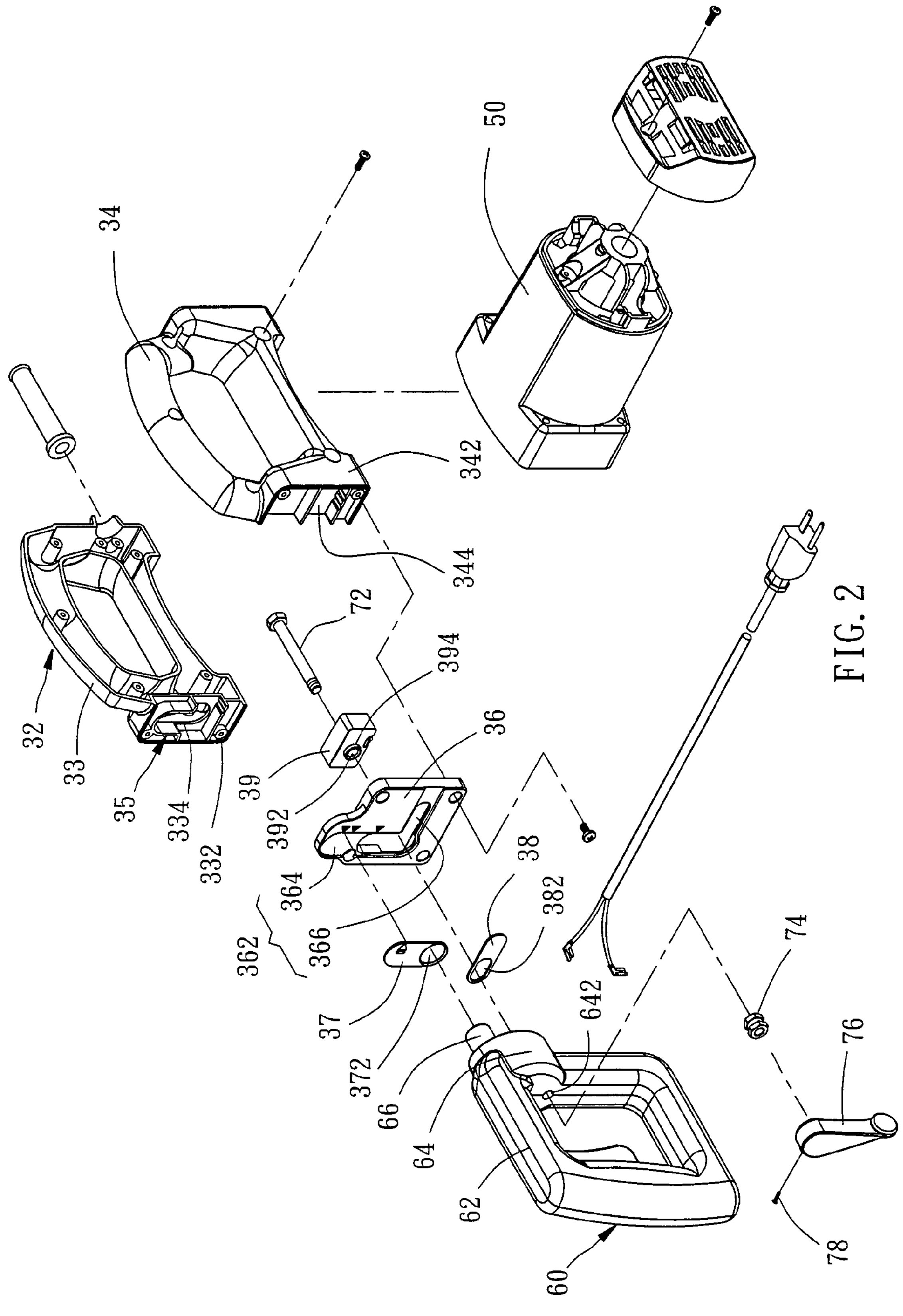
FIG. 2 is an exploded view of the sawing machine according to the present invention.

Referring to FIG. 1-7, a sawing machine 10 in accordance with a preferred embodiment of the present invention is composed of a base 20, a saw arm assembly 30, a saw blade 40, a motor 50, a handle 60, and a locking mechanism 70.

The base 20 is a flat circular block member for placing a workpiece thereon for being cut.

Figure 4:
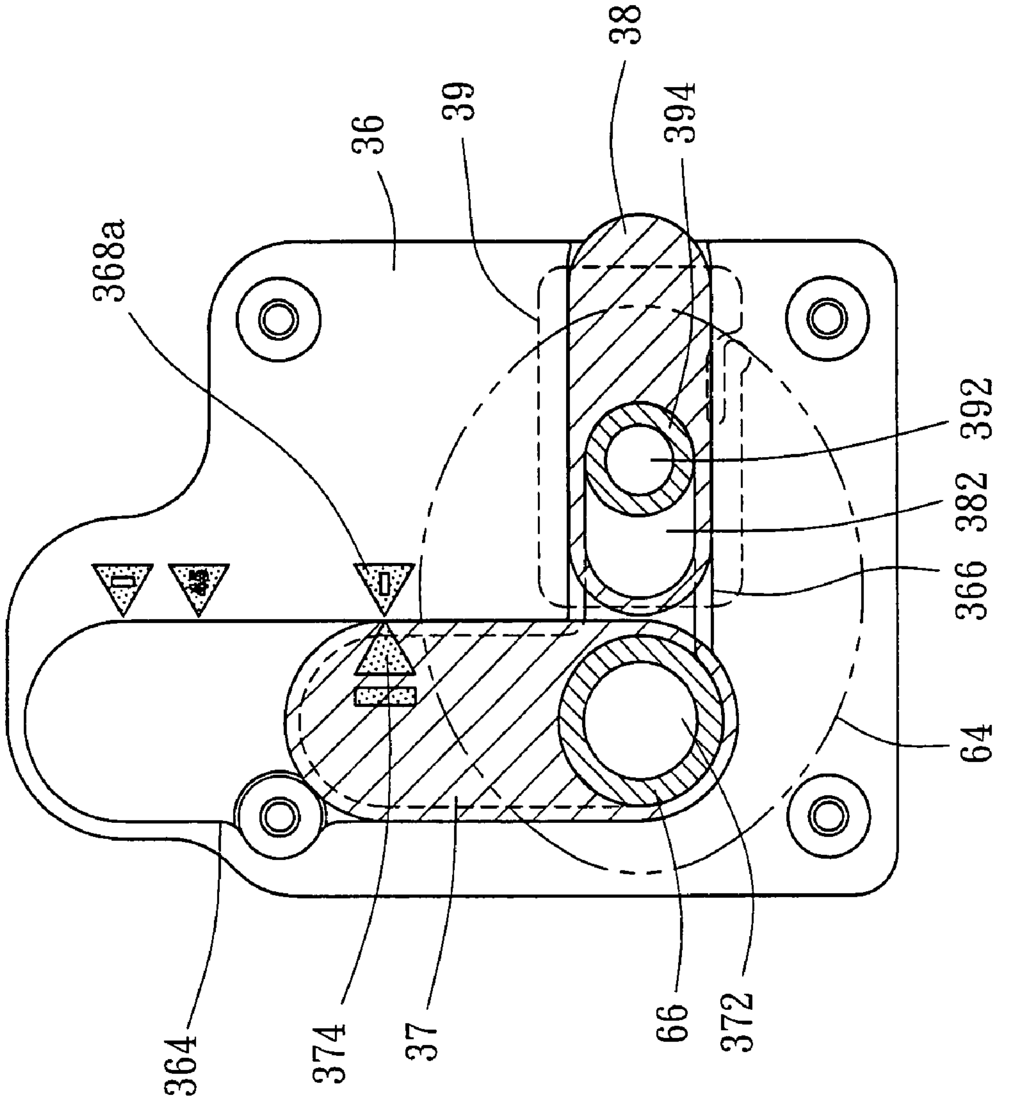
FIG. 4 is a schematic drawing showing the status of the two stop plates and the sliding block before rotation of the handle

The saw arm assembly 30 includes a body 32 formed of two half shells 33 and 34. The two half shells 33 and 34 abut together. One half shell, namely, the first half shell 33 has one end pivotally connected to the base 20, and the other end provided with a coupling portion 332. The first half shell 33 further has a first groove 334 formed in the coupling portion 332 and extending in a direction perpendicular to the base 20. The second half shell 34 has one end pivotally connected to the base 20, and the other end provided with a coupling portion 342. The second half shell 34 further has a second groove 344 formed in the coupling portion 342 and extending in a parallel manner relative to the base 20. The two half shells 33 and 34 abut each other to enable interconnection of the first groove 334 and the second groove 344 to form a L-shaped groove 35. Referring to FIG. 4, the saw arm assembly 30 further includes a mount 36 installed in the coupling portions 332 and 342. The mount 36 has a L-shaped hole 362 corresponding to the L-shaped groove 35. Further, a first stop plate 37 and a second stop plate 38 are respectively mounted in the L-shaped hole 362 of the mount 36. The L-shaped hole 362 has a vertical section 364, and a horizontal section 366. The first stop plate 37 is mounted in the vertical section 364 of the L-shaped hole 362, and movable vertically along the vertical section 364. Further, the first stop plate 37 has a circular through hole 372 at the bottom side. The second stop plate 38 is mounted in the horizontal section 366 of the L-shaped hole 362, and movable horizontally along the horizontal section 366. Further, the second stop plate 38 has an elongated slot 382 on its left half part. Further, the mount 36 has three position points **368*a*-368*c* in the vertical section 364. According to the present preferred embodiment, these three position points 368*a*-368*c* correspond to 0° position, 45° position, and 90° position respectively. The first stop plate 37 is marked with an index 374. When moving the first stop plate 37 vertically along the vertical section 364, the index 374 can be aligned at one of the three position points 368*a*-368*c*. The saw arm assembly 30 further includes a sliding block 39. The sliding block 39 is mounted in the second groove 344 of the second half shell 34, and movable horizontally along the second groove 344. The sliding block 39 has a through hole 392, and a flange 394 annularly protruding from one side thereof around the through hole 392 toward the mount 36. The flange 394 extends through the horizontal section 366 of the L-shaped hole 362 and into the elongated slot 382 of the second stop plate 38. When the sliding block 39 is horizontally moved along the second groove 344, the second stop plate 38 is carried by the flange 394 of the sliding block 39 to move along the horizontal section 366 of the L-shaped hole 362**.

The saw blade 40 is rotatably mounted on the body 32 of the saw arm assembly 30 for cutting the workpiece placed on the base 20.

The motor 50 is mounted to the body 32 of the saw arm assembly 30 for rotating the saw blade 40.

The handle 60 has a grip 62 for holding by the user, an oval protrusion 64 provided at one end of the grip 62, and a round rod 66 extending outward from the oval protrusion 64. The round rod 66 extends through the through hole 372 of the first stop plate 37 into the first groove 334 of the first half shell 33. By means of the round rod 66, the handle 60 can drive the first stop plate 37 to move vertically along the vertical section 364. Further, the oval protrusion 64 has a hole 642.

Figure 3:
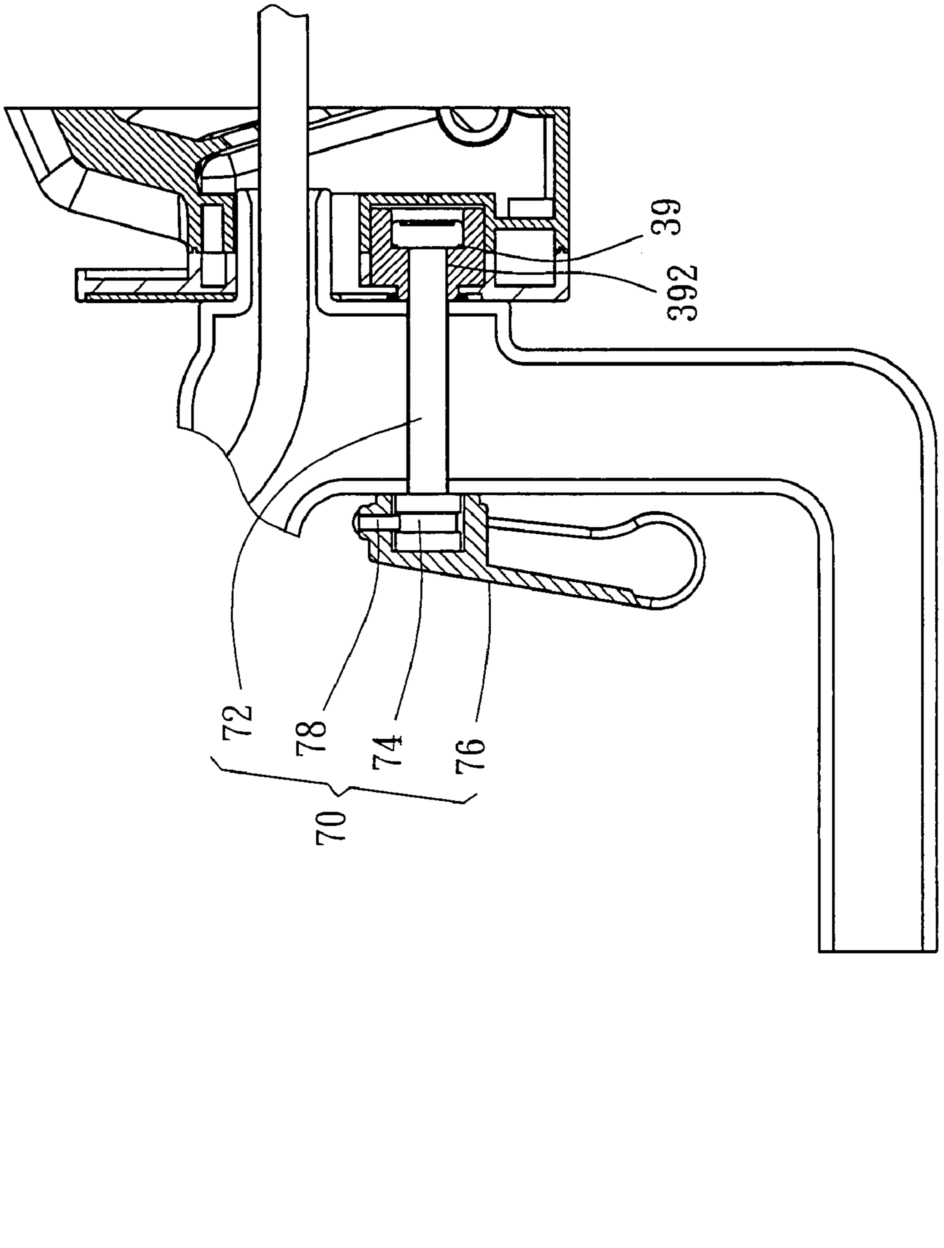
FIG. 3 is a sectional view of a part of the present invention, showing the structure of the locking mechanism.

Referring to FIG. 3, the locking mechanism 70 includes a pin 72, a locating member 74, a lever 76, and a stop rod 78. The pin 72 is peripherally threaded. The locating member 74 is a hexagonal nut having a relatively smaller outer diameter portion at a midsection thereof and a relatively greater outer diameter portion on each of the front and rear ends thereof. The pin 72 is inserted in proper order through the through hole 392 of the sliding block 39, the elongated slot 382 of the second stop plate 38 and the hole 642 of the oval protrusion 64, and then screwedly connected with the locating member 74. The lever 76 is sleeved onto the locating member 74 and stopped against the oval protrusion 64 of the handle 60. The stop rod 78 is inserted through the lever 76 and stopped against the midsection of the locating member 74 to prevent the lever 76 from rotation relative to the locating member 74, thereby locking the handle 60 at a predetermined angle.

Figure 6:
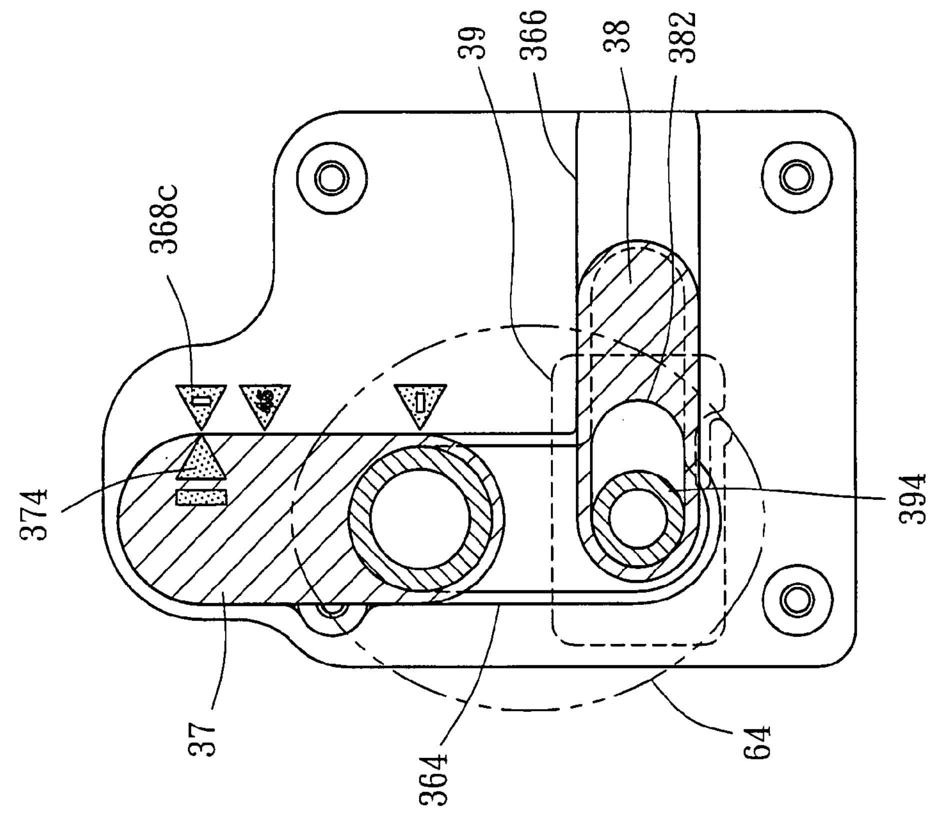
FIG. 6 is another schematic drawing showing the status of the two stop plates and the sliding block after a 90° rotation of the handle
Figure 5:
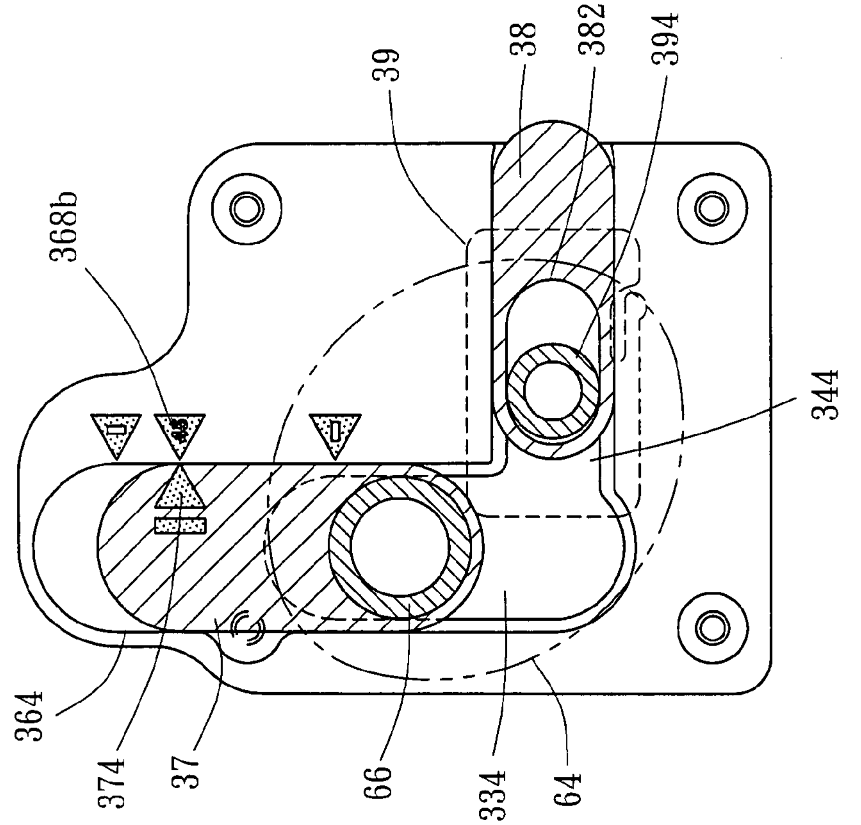
FIG. 5 is another schematic drawing showing the status of the two stop plates and the sliding block after a 45° rotation of the handle
Figure 7:
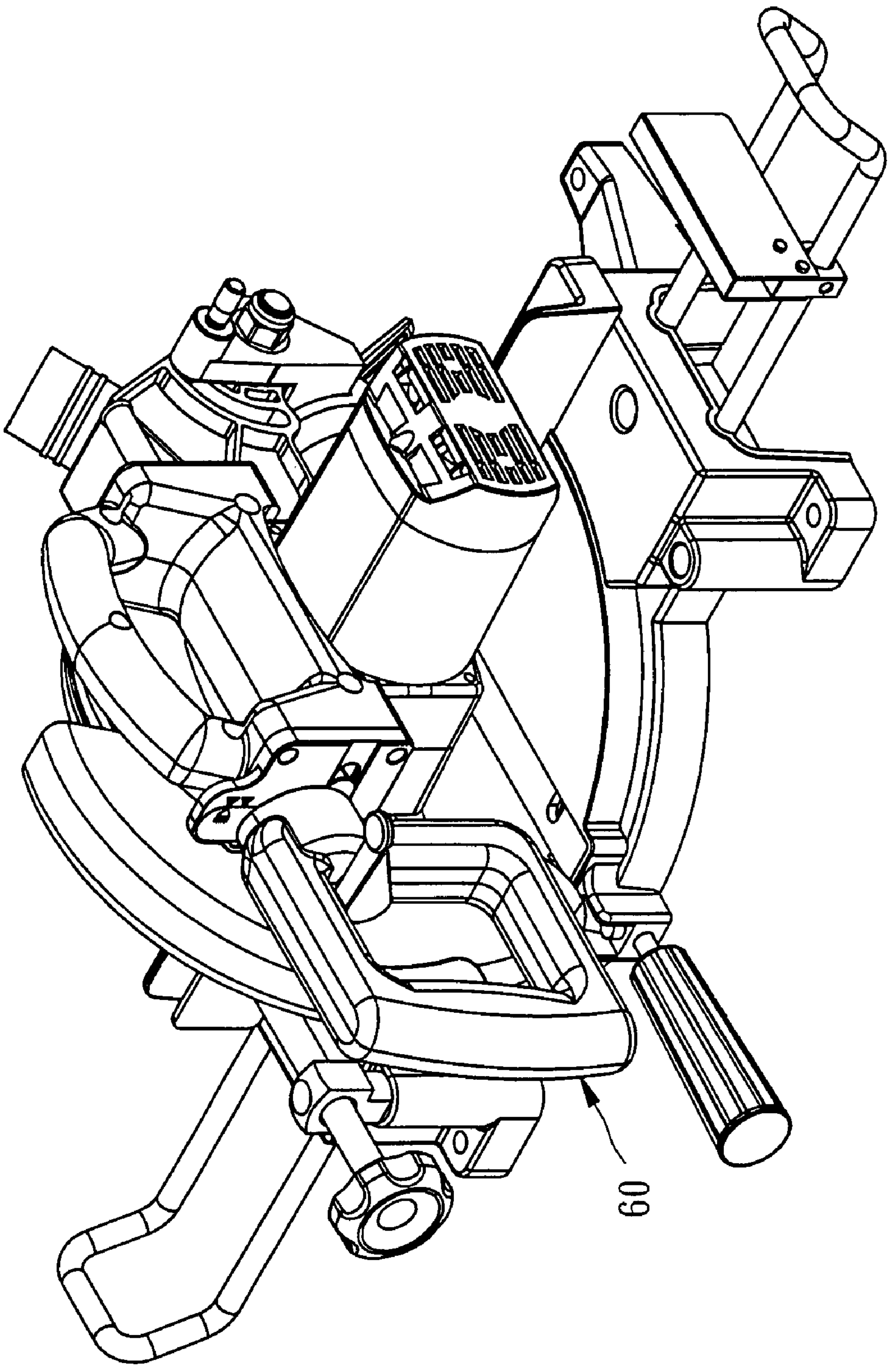
FIG. 7 is similar to FIG. 1 but showing the handle rotated for 90°.

When the handle 60 is located at the zero angle position as shown in FIGS. 1 and 4, the first stop plate 37 is located below the vertical section 364 of the L-shaped hole 362, and the index 374 of the first stop plate 37 is aligned with the position point 368*a* corresponding to the zero angle; the second stop plate 38 is located at the right side of the horizontal section 366 of the L-shaped hole 362, and the flange 394 of the sliding block 39 is located at the right end of the elongated slot 382. At this time, the operator can conveniently operate the handle 60 to cut the workpiece in vertical direction. When intending to adjust the handle 60 to 45° angle, it is necessary to loosen the locating member 76 to the unlocking position, and then to rotate the handle 60 clockwise. When the handle 60 is rotated clockwise, as shown in FIG. 5, the round rod 66 of the handle 60 is moved upwards along the first groove 334 of the L-shaped groove 35 to carry the first stop plate 37 upwards along the vertical section 364 of the L-shaped hole 362 to enable the index 374 to be aligned with the position point 368*b* corresponding to 45° angle, and at the same time, the handle 60 moves the sliding block 39 leftwards along the second groove 344 of the L-shaped groove 35 to enable the flange 394 of the sliding block 39 to be moved from the right end of the elongated slot 382 of the second stop plate 38 to the left end of the elongated slot 382. Thereafter, the lever 76 is turned to the locking position to lock the handle 60 to the 45° angle position. If the operator keeps rotating the handle 60 clockwise, as shown in FIG. 6, the handle 60 moves the first stop plate 37 to the top side of the vertical section 364 of the L-shaped hole 362 to enable the index 374 of the first stop plate 37 to be aligned with the position point 368*c* corresponding to 90° angle. When the first stop plate 37 is moved to the top side of the vertical section 364 of the L-shaped hole 362, the handle 60 simultaneously carries the sliding block 39 leftwards. At this time, the flange 394 of the sliding block 39 moves the second stop plate 38 leftwards along the horizontal section 366 of the L-shaped hole 362 to enable the second stop plate 38 to be positioned in the intersection between the vertical section 364 and horizontal section 366 of the L-shaped hole 362, and the handle 60 is now located at the 90° angle position as shown in FIG. 7. Further, the first stop plate 37 and the second stop plate 38 each provide a function of preventing the chippings from going through the L-shaped hole 362 into the L-shaped groove 35 and from hindering movement of the sliding block 39.

By means of the aforesaid design and subject to different cutting requirements, the operator can conveniently unlock the locking mechanism and adjust the angle of the handle between 0° and 90°, and then lock the locking mechanism again after the handle has been adjusted to the desired angle. Because the handle can be conveniently adjusted to the desired angle within 0°-90°, the user can apply force to the handle to move the saw blade in cutting the workpiece efficiently.

Although a particular embodiment of the invention has been described in detail for purposes of illustration, various modifications and enhancements may be made without departing from the spirit and scope of the invention. Accordingly, the invention is not to be limited except as by the appended claims

What is claimed is:

1. A sawing machine comprising:
- a base;
- a saw arm assembly pivotally connected to said base, said saw arm assembly having a L-shaped groove;
- a saw blade pivotally mounted to said saw arm assembly;
- a handle pivotally mounted to the L-shaped groove of said saw arm assembly for rotatable movement relative to said saw arm assembly;
- a locking mechanism mounted to said handle and connected to said saw arm assembly for locking said handle to said saw arm assembly at a predetermined angle; and
- wherein said saw arm assembly comprises a sliding block movably mounted to one part of said L-shaped groove, and said handle is movably mounted to the other part of said L-shaped groove and connected with said sliding block.

2. The sawing machine as claimed in claim 1, wherein said saw arm assembly further comprises a body and a mount mounted on said body, said body having said L-shaped groove defined therein, said mount having a L-shaped hole corresponding to said L-shaped groove and having two stop plates, one of said two stop plates being connected to said handle and movably mounted to one part of said L-shaped hole, the other stop plate being connected to said sliding block and movably mounted to the other part of said L-shaped hole.

3. The sawing machine as claimed in claim 2, wherein said mount comprises at least two position points; one of said stop plates is marked with an index for alignment with one of said position points and indicating the angle of rotation of said handle relative to said saw arm assembly.

4. The sawing machine as claimed in claim 2, wherein one of said stop plates comprises a through hole; the other stop plate comprises an elongated slot; said handle comprises a projecting rod mounted to the through hole of said stop plate; said sliding block comprises a flange mounted to the elongated slot of said stop plate.

5. The sawing machine as claimed in claim 4, wherein said locking mechanism comprises a pin inserted through said sliding block, the elongated slot of said stop plate, and said handle, a locating member fastened to one end of said pin to secure said pin to said handle, a lever sleeved onto said locating member, and a stop rod inserted through said lever to stop against said locating member to lock said lever to said locating member at a predetermined angle.

6. The sawing machine as claimed in claim 5, wherein said sliding block comprises a through hole; the flange of said sliding block annularly protrudes outward from one end of the through hole of said sliding block; said pin extends through said through hole of said sliding block.

* * * * *